United States Patent
Lee et al.

(10) Patent No.: US 9,383,601 B2
(45) Date of Patent: Jul. 5, 2016

(54) LIQUID CRYSTAL DISPLAY AND FABRICATION METHOD OF THE SAME

(71) Applicant: SAMSUNG DISPLAY CO., LTD., Gyeonggi-Do (KR)

(72) Inventors: Dae-Young Lee, Gyeonggi-do (KR); Jung Gun Nam, Seoul (KR); Gugrae Jo, Chungcheongnam-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 193 days.

(21) Appl. No.: 13/747,823

(22) Filed: Jan. 23, 2013

(65) Prior Publication Data
US 2014/0055715 A1    Feb. 27, 2014

(30) Foreign Application Priority Data

Aug. 27, 2012   (KR) .......................... 10-2012-0093848

(51) Int. Cl.
*G02F 1/1335*    (2006.01)

(52) U.S. Cl.
CPC .... *G02F 1/133528* (2013.01); *G02F 1/133512* (2013.01); *G02F 2001/133548* (2013.01)

(58) Field of Classification Search
None
See application file for complete search history.

(56) References Cited

U.S. PATENT DOCUMENTS

| | | | |
|---|---|---|---|
| 6,061,112 A * | 5/2000 | Ukita et al. | ................... 349/113 |
| 7,608,474 B2 | 10/2009 | Kumai et al. | |
| 7,951,527 B2 | 5/2011 | Choo et al. | |
| 7,998,661 B2 | 8/2011 | Kim et al. | |
| 8,027,086 B2 | 9/2011 | Guo et al. | |
| 8,033,813 B2 | 10/2011 | Cherala et al. | |
| 8,075,299 B2 | 12/2011 | Xu et al. | |
| 8,120,727 B2 | 2/2012 | Wang et al. | |
| 8,525,958 B2 * | 9/2013 | Lee | ................................ 349/96 |
| 2007/0285598 A1 | 12/2007 | Hwang et al. | |
| 2008/0041816 A1 | 2/2008 | Choo | |
| 2008/0094547 A1 * | 4/2008 | Sugita et al. | .................... 349/96 |
| 2008/0143638 A1 | 6/2008 | Kim et al. | |
| 2008/0299467 A1 | 12/2008 | Kim et al. | |
| 2009/0052030 A1 | 2/2009 | Kaida et al. | |
| 2011/0052802 A1 | 3/2011 | Kaida et al. | |
| 2011/0128475 A1 | 6/2011 | Park et al. | |
| 2011/0285942 A1 | 11/2011 | Guo et al. | |
| 2011/0286094 A1 | 11/2011 | Kaida et al. | |
| 2012/0086887 A1 | 4/2012 | Lee et al. | |
| 2014/0028956 A1 * | 1/2014 | Choi et al. | ...................... 349/96 |

FOREIGN PATENT DOCUMENTS

| | | |
|---|---|---|
| JP | 2007-334346 | 12/2007 |
| KR | 1020050017871 | 2/2005 |
| KR | 100741343 | 7/2007 |
| KR | 100793176 | 1/2008 |
| KR | 1020090025795 | 3/2009 |
| KR | 1020090064109 | 6/2009 |
| KR | 1020090068859 | 6/2009 |
| KR | 1020100133130 | 12/2010 |
| KR | 1020110110889 | 10/2011 |

* cited by examiner

*Primary Examiner* — Richard Kim
(74) *Attorney, Agent, or Firm* — F. Chau & Associates, LLC

(57) ABSTRACT

A liquid crystal display apparatus includes a liquid crystal layer, a light source, a first polarizing member, and a reflector. The first polarizing member includes a wire-grid polarizing part and a reflection part. The first polarizing member is disposed between the liquid crystal layer and the light source. The reflector is disposed below the light source. The reflector reflects light from the light source and light reflected from the reflection part.

16 Claims, 21 Drawing Sheets

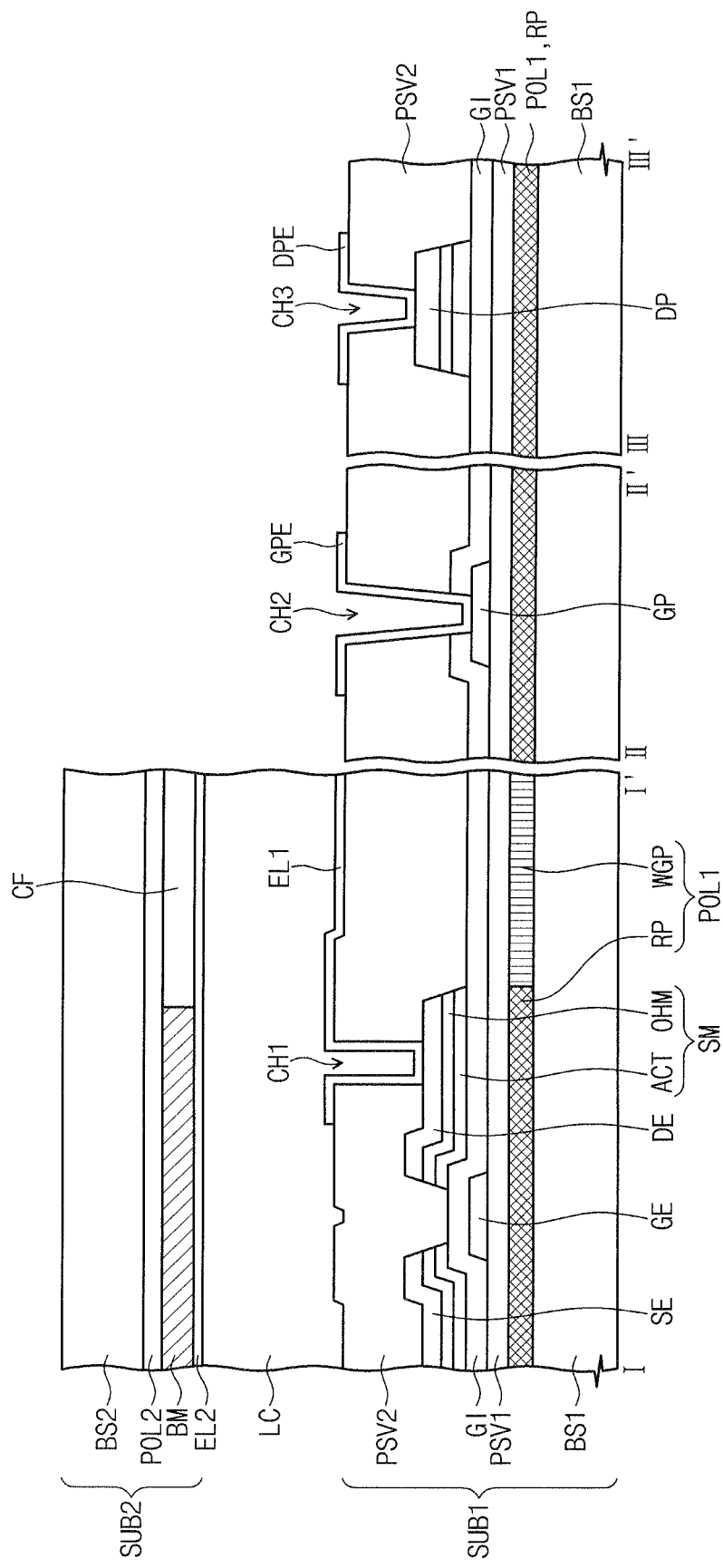

LIQUID CRYSTAL DISPLAY AND FABRICATION METHOD OF THE SAME

CROSS-REFERENCE TO RELATED APPLICATIONS

This application claims priority under 35 U.S.C. §119 to Korean Patent Application No. 10-2012-0093848, filed on Aug. 27, 2012 in the Korean Intellectual Property Office, the disclosure of which is incorporated by reference herein in its entirety.

TECHNICAL FIELD

The present inventive concept relates to a liquid crystal display and, more particularly, to a liquid crystal display including a wire-grid polarizing member.

DESCRIPTION OF THE RELATED ART

Liquid crystal displays (LCDs) are flat panel displays that have been widely used in cell phones, laptop computers, monitors, television (TV) sets or the like in recent years.

LCDs use a backlight unit to provide light. The backlight unit includes a light source, a light guide panel for enhancing efficiency of light travelling to the LCD, and a plurality of optical sheets. Accordingly, light emitted from the light source is considerably lost while passing through the light guide panel and the optical sheets. In addition, the polarizing plates are absorption-type polarizing plates that absorb some of light and transmit some of the light. The polarizing plates absorb about 50 percent of the light travelling to the liquid crystal panel. As a result, a user may see only a relatively small portion (e.g., 10 percent or less) of the light emitted from the light source.

SUMMARY OF THE INVENTION

According to an exemplary embodiment of the inventive concept, a liquid crystal display apparatus includes a liquid crystal layer, a black matrix, and a first polarizing member. The black matrix is disposed on the liquid crystal layer. The first polarizing member is disposed on an opposite side of the liquid crystal layer from the black matrix. The first polarizing member includes a wire-grid polarizing part and a reflection part. The reflection part is aligned under the black matrix.

According to an exemplary embodiment of the inventive concept, a fabrication method of a liquid crystal display apparatus includes a step of forming a first polarizing member including a wire-grid polarizing part and a reflection part on a first base substrate. A black matrix is disposed on the second base substrate. The second base substrate is stacked on the first base substrate so that the black matrix is aligned over the reflection part.

According to an exemplary embodiment of the inventive concept, a liquid crystal display apparatus includes a liquid crystal layer, a light source, a first polarizing member, and a reflector. The first polarizing member includes a wire-grid polarizing part and a reflection part. The first polarizing member is disposed between the liquid crystal layer and the light source. The reflector is disposed below the light source. The reflector reflects light from the light source and light reflected from the reflection part.

BRIEF DESCRIPTION OF THE DRAWINGS

These and other features of the inventive concept will become more apparent by describing in detail exemplary embodiments thereof with reference to the accompanying drawings of which:

FIG. 13 is a cross-sectional view of a liquid crystal display according to an exemplary embodiment of the inventive concept.

DETAILED DESCRIPTION

Figure 1:
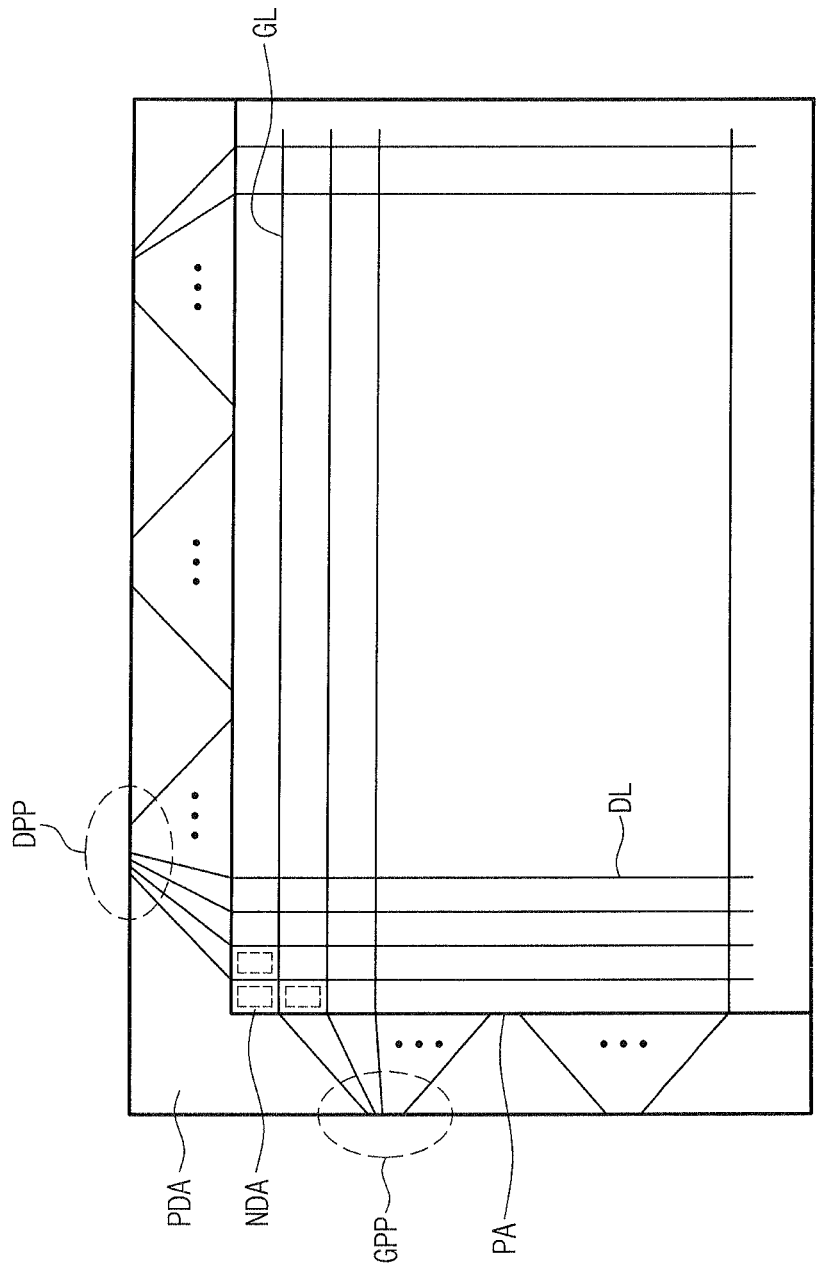
FIG. 1 is a plan view of a liquid crystal display according to an exemplary embodiment of the inventive concept.

Exemplary embodiments of the inventive concept will be described below in more detail with reference to the accompanying drawings. However, the inventive concept may be embodied in different forms and should not be construed as limited to the embodiments set forth herein. Rather, these exemplary embodiments are provided so that this disclosure will be thorough and complete and will fully convey the inventive concept to those skilled in the art. In the drawings, the thickness of layers and regions may be exaggerated for clarity. Like reference numerals may refer to the like elements throughout.

It will be understood that when an element or layer is referred to as being "on" another element or layer, it may be directly on the other layer or intervening layers may be present. Like numbers may refer to like elements throughout.

It will be understood that when an element is referred to as being "connected" to another element, it maybe directly connected to the other element or intervening elements may be present.

Figure 2:
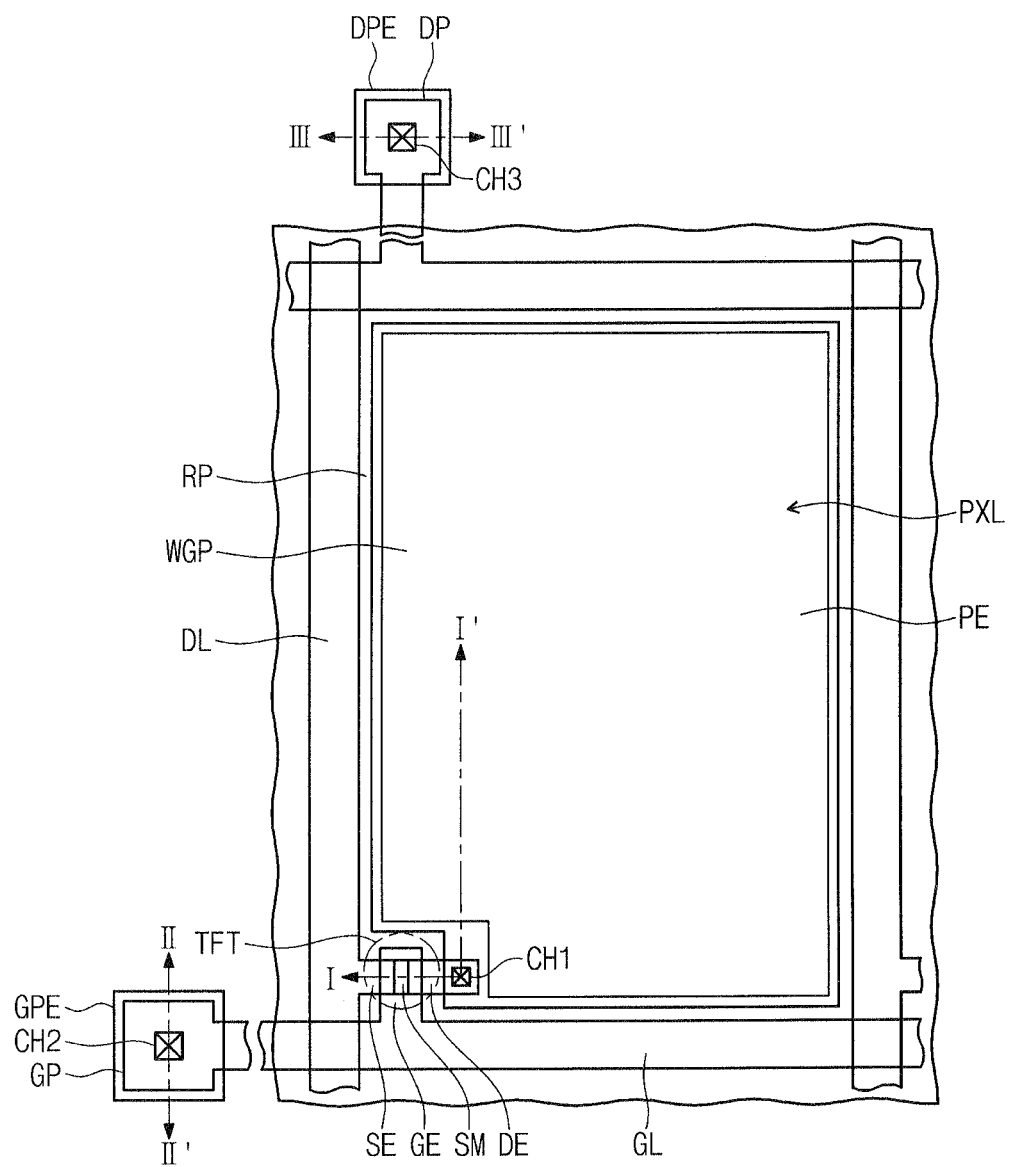
FIG. 2 is a plan view showing a portion of the liquid crystal display according to an exemplary embodiment of the inventive concept.

FIG. 1 is a plan view of a liquid crystal display according to an embodiment of the inventive concept. FIG. 2 is a plan view showing a portion of the liquid crystal display in FIG. 1, and FIG. 3 is a cross-sectional views taken along lines I-I', II-II', and III-III' in FIG. 2.

Referring to FIG. 1, a liquid crystal display according to embodiments of the inventive concept may include a plurality of pixels PXL that are arranged in a matrix of rows and columns. Since the pixels PXL have the same structure, the embodiments of the inventive concept will be described hereinafter with respect to only one pixel PXL as an example for the brevity of description. Therefore, only one pixel PXL is shown in FIGS. 2 and 3. Although it is shown that the pixel PXL have the shape of rectangle elongated in one direction, the shape of the pixel PXL is not limited thereto. In a plan view, the pixel PXL may have various shapes such as V-shape, Z-shape or the like.

Figure 3:
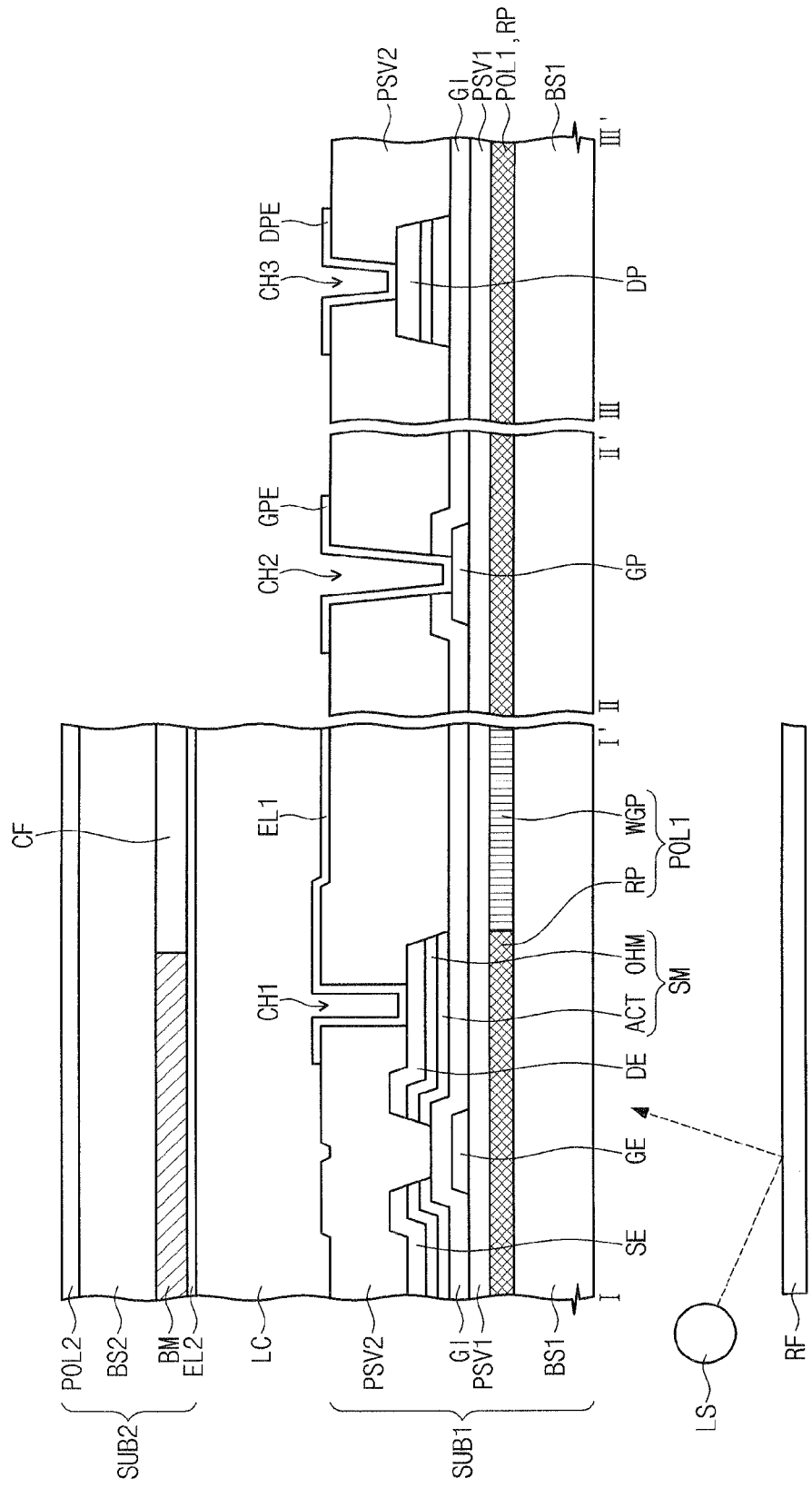
FIG. 3 is a cross-sectional views taken along lines I-I', II-II', and III-III' of FIG. 2.

Referring to FIGS. 1, 2, and 3, a liquid crystal display according to an embodiment of the inventive concept includes a first substrate SUB1, a second substrate SUB2 opposite to the first substrate SUB1, and a liquid crystal layer LC provided between the first and second substrates SUB1 and SUB2.

The first substrate SUB1 includes a first base substrate BS1, a first polarizing member POL1 disposed on the first base substrate BS1, a wiring part disposed on the first base substrate BS1, a thin film transistor connected to the wiring part, and a first electrode EL1 connected to the thin film transistor.

The first base substrate BS1 may be a transparent or opaque insulating substrate such as a silicon substrate, a glass substrate, and a plastic substrate.

The first base substrate BS1 includes a pixel area PA and a pad area PDA. The pixel area PA includes a plurality of pixels PXL. The pad area PDA is disposed on at least one side of the pixel area PA. The pixel area PA includes a display area DA and a non-display area NDA. The display area DA displays images in one-to-one correspondence through the pixels PXL. The non-display area NDA corresponds to an area on which images are not displayed.

The first polarizing member POL1 is provided in the display area DA on the first base substrate BS1. The first polarizing member POL1 includes a wire-grid polarizing part WGP that polarizes the light passing through the first substrate SUB1 in a specific direction and a reflection part RP that reflects the light traveling upwardly from the bottom.

The wire-grid polarizing part includes a wire-grid polarizer that linearly polarizes the light. The wire-grid polarizer includes fine metal wires extended in parallel with a direction. The fine metal wires are also spaced apart by a spacing pitch of about 100 nanometers. The fine metal wires may have a line width less than about 60 nanometers and have a thickness greater than about 150 nanometers. The arrangement direction of the fine metal wires may be a direction parallel, perpendicular or oblique to the gate line.

The wire-grid polarizer passes light of a specific polarization. For example, when light is incident on the wire-grid polarizer, the fine metal wires passes light of a polarization parallel to a space between the fine metal wires in the incident light and reflects light of other polarization in the incident light. The polarized light passing through the wire-grid polarizer is p-polarized light, and the reflected light from the metal wires is s-polarized light. As shown in FIG. 3, when light is incident below the wire-grid polarizer, only the p-polarized light passes through the wire-grid polarizer.

The fine metal wires may include a high-reflectivity metal. For example, the high-reflectivity metal includes aluminum, gold, silver, copper, chromium, iron, nickel, molybdenum or an alloy thereof. The metal wires may have a single layer of high-reflectivity metal or an alloy including at least two high-reflectivity metals. In an exemplary embodiment of the inventive concept, the fine metal wire includes aluminum. In an exemplary embodiment of the inventive concept, the fine metal wires may have multiple layers each of which is made of a single high-reflectivity metal or an alloy including at least two high-reflectivity metals. For example, the fine metal wires include a double layer including aluminum at a lower layer and titanium at an upper layer. Alternatively, the fine metal wires include a double layer including a lower layer of aluminum and an upper layer of molybdenum.

The reflection part RP is disposed in the non-display area NDA on the first base substrate BS1. For example, the reflection part RP is formed at an area where a black matrix BM (explained later) is formed. The reflection part RP is made of a metal layer. As shown in FIG. 3, the reflection part RP reflects light which is incident below the reflection part RP.

The metal layer may have substantially the same material as the fine metal wire. For example, the metal layer includes aluminum, gold, silver, copper, chromium, iron, nickel, molybdenum or an alloy thereof. The metal layer may have a single layer of a high-reflectivity metal or an alloy including at least two high-reflectivity metals. In an exemplary embodiment of the inventive concept, the metal layer includes aluminum. In an exemplary embodiment of the inventive concept, the metal layer may have multiple layers each of which is made of a single high-reflectivity metal or an alloy including at least two high-reflectivity metals. For example, the reflection part RP includes a double layer including aluminum at a lower layer and titanium at an upper layer. Alternatively, the reflection part RP includes a double layer including a lower layer of aluminum and an upper layer of molybdenum.

A first passivation layer PSV1 is disposed on the metal layers RP and WGP to cover the metal layers RP and WGP.

The wiring part is disposed on the first passivation layer PSV1 in the non display area NDA. The wiring part includes a gate line GL, a data line DL, a gate pad part GPP, and a data pad part DPP which are provided in the non-display area NDA. The gate pad part GPP and the data pad part DPP will be explained in detail later.

The gate line GL is disposed on the first base substrate BS, extending in a first direction D1.

A gate insulating layer GI is disposed on the gate line GL. The gate insulating layer GI may be made of an inorganic insulating material and include, for example, silicon nitride, or silicon oxide.

The data line DL is insulated from the gate line GL on the first base substrate BS1. For example, the gate insulating layer GI is disposed between the gate line GL and the data line DL. The data line DL extends in a second direction D2 perpendicular to the first direction D1.

The thin film transistor is disposed in the non-display area NDA and connected to the gate line GL and the data line DL. The thin film transistor includes a gate electrode GE, a semiconductor layer SM, a source electrode SE, and a drain electrode DE.

The gate electrode GE protrudes from the gate line GL or is provided on a partial area of the gate line GL. The gate line GL and the gate electrode GE may be formed of a metal. For example, the gate electrode GE may include nickel, chromium, molybdenum, aluminum, titanium, copper, tungsten, or an alloy thereof. The gate electrode GE may have a single or multiple layers using the metal. For example, the gate electrode GE may have a triple layer made of a molybdenum layer, an aluminum layer, and a molybdenum layer that are sequentially stacked. The gate electrode may have a double layer made of a titanium layer and a copper layer that are sequentially stacked. The gate electrode GE may have a single layer made of a titanium-copper alloy.

The gate insulating layer GI is formed on the first base substrate BS1 to cover the gate electrode GE.

The semiconductor layer SM is disposed on the gate insulating layer GI, overlapping partly the gate electrode. The semiconductor layer SM includes an active layer ACT disposed on the gate insulating layer GI. An ohmic contact layer OHM is disposed on the active layer ACT. The active layer ACT is disposed on the gate insulating layer GI. The ohmic contact layer OHM is disposed on the active layer ACT. The source electrode SE and the drain electrode DE are disposed on the OHM. The semiconductor layer SM is formed on an area between the source electrode SE and the drain electrode DE.

The source electrode SE protrudes from the data line DL, crossing over the gate electrode GE. The semiconductor layer SM constitutes a conductive channel between the source electrode SE and the drain electrode DE.

Each of the source and drain electrodes SE and DE may include a single layer formed of a conductive material, e.g., a metal. For example, the conductive metal may include nickel, chromium, molybdenum, aluminum, titanium, copper, tungsten or an alloy thereof. In an embodiment of the inventive concept, each of the source and drain electrodes SE and DE may include multiple layers formed of a conductive material. For example, each of the source and drain electrodes SE and DE may include a double layer formed of titanium and copper.

The first electrode EL1 is connected to the drain electrode DE with a second passivation layer PSV2 interposed therebetween. A first contact hole CH1 is formed at the second passivation layer PSV2 to expose a portion of the drain electrode DE of the thin film transistor. The first electrode EL1 is connected to the thin film transistor through the first contact hole CH1.

In FIG. 3, a cross-sectional structure of the gate pad part GPP is shown. The gate pad part GPP and the data pad part DPP of the wiring part are disposed in the pad area PDA. The gate pad part GPP includes a gate pad GP and a gate pad electrode GPE connected to the gate pad GP. The gate pad GP is disposed on the first base substrate BS1, being connected to the corresponding gate line GL. The gate insulating layer GI and the second passivation layer PSV2 covers the gate pad GP. A second contact hole CH2 is formed to expose a portion of an upper surface of the gate pad GP. The gate pad electrode GPE is connected to the gate pad GP through the second contact hole CH2.

In FIG. 3, a cross-sectional structure of the data pad part GPP is shown. The data pad part DPP includes a data pad DP and a data pad electrode DPP connected to the data pad DP. The data pad DP is disposed on the gate insulating layer GI, being connected to the corresponding data line DL. The second passivation layer PSV2 covers the data pad DP. A third contact hole CH3 is formed exposing a portion of an upper surface of the data pad DP. The data pad electrode DPE is connected to the data pad DP through the third contact hole CH3.

According to an exemplary embodiment of the inventive concept, the gate pad part GPP and the data pad part DPP may be electrically connected to an interconnection. However, the inventive concept is not limited thereto. In an embodiment of the inventive concept, a gate driver including a plurality of amorphous silicon transistors may be provided instead of the gate pad part GPP. The amorphous silicon transistors may be formed directly on the pad area PDA of the first base substrate BS1 by means of the thin film transistor fabrication process.

In FIG. 3, the second substrate SUB2 includes a second base substrate BS2, a color filter CF, a black matrix BM, a second electrode EL2, and a second polarizing member POL2. The second substrate SUB2 is stacked over the first substrate SUB1. A liquid crystal layer LC is disposed between the first substrate SUB1 and the second substrate SUB2.

The second base substrate BS2 includes an upper surface on which the second polarizing member POL2 is disposed and a lower surface on which the black matrix BM and the color filter CF are disposed.

The color filter CF is provided on the second base substrate BS2. The color filter CF provides a color to light passing through each pixel PXL. The color filter CF may include a red color filter, a green color filter, or a blue color filter and may be provided to pixels PXL in the pixel area PA. The color filter CF may also include a white color filter. In the color filter CF, when the pixel PXL is provided in plurality, color filters CF having different colors may be arranged such that adjacent pixels PXL exhibit the different colors. The color filters CF may be adjacent each other or may partially overlap.

The black matrix BM is disposed in the non-display area NDA to block light that is not used to display images. For example, the black matrix BM blocks light leakage caused by abnormal behavior of liquid crystal molecules. Such abnormal behavior may occur at the edge of an image display layer (explained later) or occur at the edge of the color filter CF where colors are mixed.

The black matrix BM may be disposed at least one side of the color filter CF. For example, the black matrix is disposed at the perimeter of the color filter CF, which corresponds to the perimeter of each pixel PXL. The color filter CF and the block matrix BM may overlap each other in a region adjacent to the boundary of the pixel PXL.

The second electrode EL2 is disposed on the color filter CF and the black matrix BM. The second electrode EL2 and the first electrode EL1 produce an electric field. Each of the first and second electrodes EL1 and EL2 may include a transparent conductive material. The transparent conductive material includes transparent conductive oxide such as indium tin oxide (ITO), indium zinc oxide (IZO), and indium tin zinc oxide (ITZO).

The second polarizing member POL2 is disposed on the second base substrate BS2. The second polarizing member POL2 polarizes light traveling upwardly from a lower portion, i.e., polarizes light passing through the liquid crystal layer LC.

The second polarizing member POL2 may have a polarization axis perpendicular or parallel to that of the first polarizing member POL1, depending on locations of the first and second electrodes EL1 and EL2, a display mode (e.g., normally black mode), and the like.

The second polarizing member POL2 may include a polarizing film and a light absorbing material. The polarizing film may include polymer resins whose polymer chains are stretched in a specific direction. The polarizing film may transmit light polarized parallel to the direction. Light polarized perpendicular to the stretched direction may be absorbed by the light absorbing material of the polarizing film. The second polarizing member POL2 may be attached to the second base substrate BS2 with an adhesive layer (not shown).

The liquid crystal layer LC is disposed between the first substrate SUB1 and the second substrate SUB2. The liquid crystal layer LC includes liquid crystal molecules having optical anisotropy. The liquid crystal molecules are driven by an electric field and transmit or block light passing through the liquid crystal layer LC to display an image.

In the liquid crystal display according to an embodiment of the inventive concept, a pixel PXL, a displaying unit, may be constituted by the thin film transistor, the first electrode EL1, the liquid crystal layer LC, and the second electrode EL2.

In driving the pixel PXL, a gate signal is applied through the gate line GL and a data signal is applied to the source electrode SE through the data line DL disposed on the semiconductor layer SM. In response to the gate signal, the thin film transistor turns on and provides the data signal to the first electrode EL1. The data signal may generate an electric field between the first electrode EL1 and the second electrode EL2. A common voltage is applied to the second electrode EL2. Liquid crystal molecules are aligned according to the electric field to display such that an image corresponding to the data signal is displayed according to the intensity of light transmitting the liquid crystal layer LC.

A backlight unit may include a light source LS and a reflection plate RF. The light source LS may be positioned below the first base substrate BS1 and may emit light to display images through the liquid crystal layer LC. The light source LS may emit light in all directions. The light directed to the base substrate BS1 may be used to display images. The reflection plate RF may reflect the light travelling away from the first base substrate to the first base substrate BS1. Such travelling-away light might be wasted without the reflection plate RF. Accordingly, the travelling-away light is re-cycled and the luminance of the liquid crystal display is increased.

Figure 4:
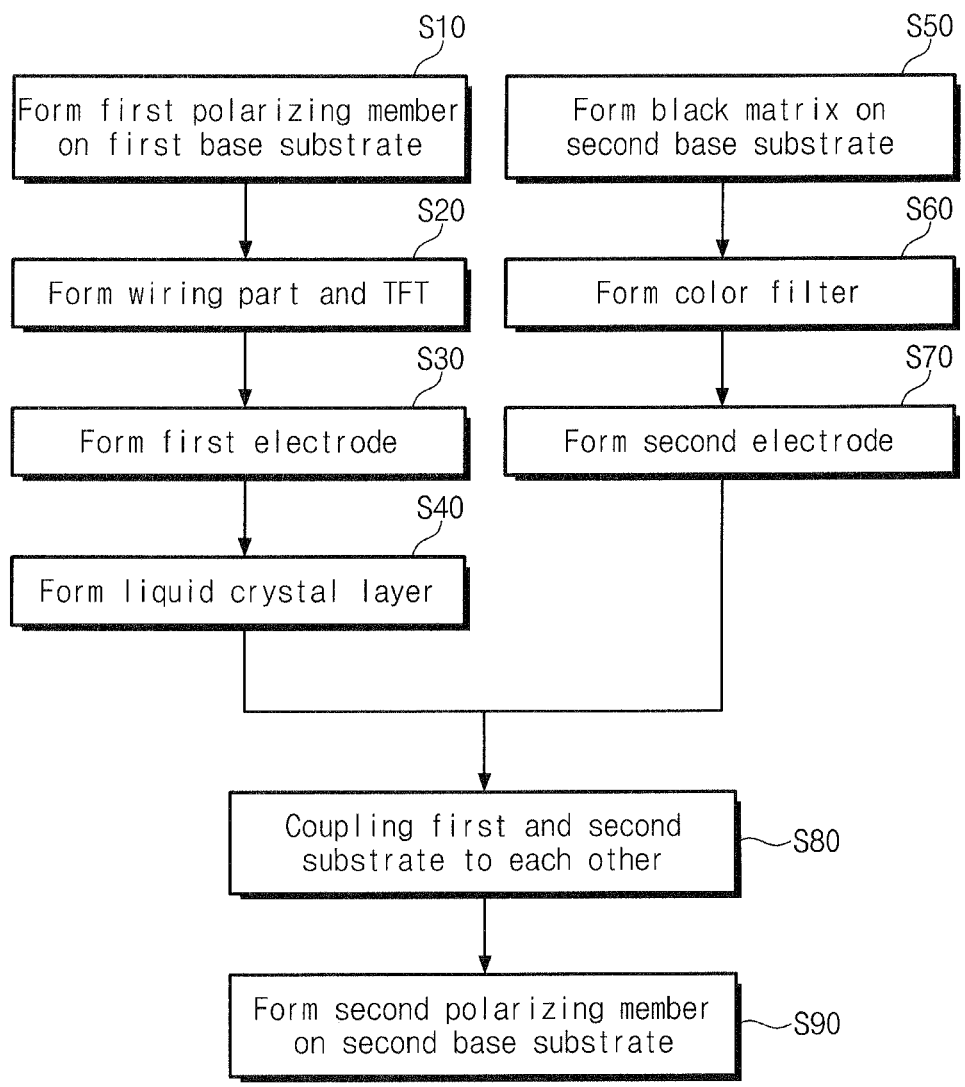
FIG. 4 is a flowchart illustrating a fabrication method of a liquid crystal display according to an exemplary embodiment of the inventive concept.

FIG. 4 is a flowchart illustrating a fabrication method of a liquid crystal display of FIGS. 1 to 3 according to an exemplary embodiment of the inventive concept. The process steps S10 to S30 are for fabricating the first substrate SUB1 of FIG. 3. The process steps S50 to S70 are for fabricating a part of the second substrate SUB2 of FIG. 3. In an exemplary embodiment, the second polarizing member POL2 of the second substrate SUB2 may be formed after the substrates SUB1 and the part of second substrate SUB2 is coupled together. In an embodiment, the second substrate SUB2 of FIG. 3 may be fabricated before the substrates SUB1 and SUB2 are coupled together in the process step S80.

In fabricating the first substrate SUB1, a first polarizing member POL1 is formed on the first base substrate BS1 (S10). The signal interconnection and the thin film transistor are formed (S20) on the first polarizing member PSV1. The first electrode (EL1) is formed on a first substrate BS1 (S30).

In fabricating the part of the second substrate SUB2, a black matrix BM is formed on a lower side of the second base substrate BS2 (S50). The color filter CF is also formed on the lower side of the second base substrate BS2 (S60). The second electrode (EL2) is formed on the lower side of second base substrate BS2 (S70).

In step S50, the liquid crystal layer LC may be disposed on the first substrate SUB1. Then, the part of the second substrate SUB2 is disposed on the liquid crystal layer LC (S80). The second polarizing member is disposed on the part of the second substrate SUB2 to fabricate a liquid crystal display (S90).

Figure 5:
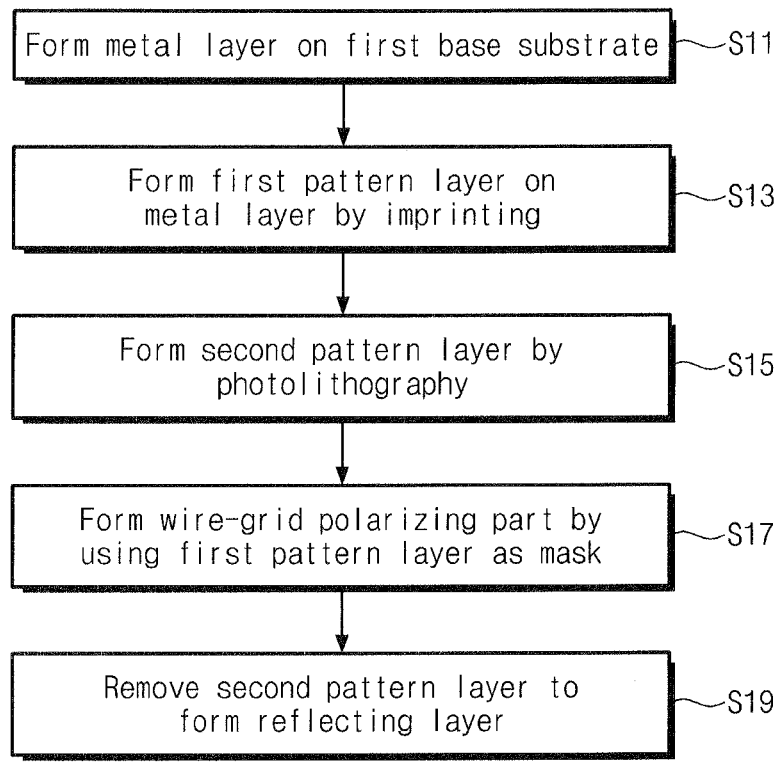
FIG. 5 is a flowchart illustrating formation of a first polarizing member on a first base substrate according to an exemplary embodiment of the inventive concept.

Hereinafter, a fabrication method of forming the first polarizing member POL1 of FIGS. 1 to 3 is described. FIG. 5 is a flowchart illustrating formation of a first polarizing member. FIGS. 6A to 6G are cross-section views illustrating process steps of the flowchart of FIG. 5.

Figure 6A:
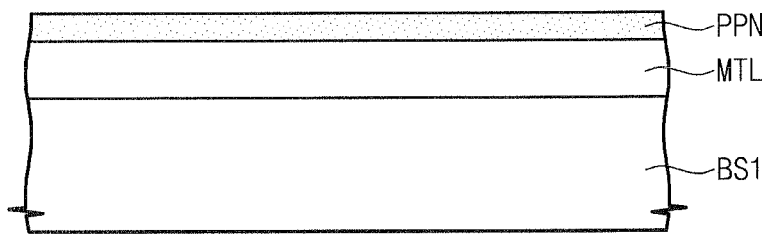
FIGS. 6A to 6G are cross-sectional views illustrating formation of the first polarizing member according to the flowchart of FIG. 5.

Referring to FIG. 6A, a metal layer MTL and a preliminary pattern layer PPN are sequentially formed on a first base substrate BS1 according to a process step S11.

In the step of S11, the metal layer MTL may be formed on the first base substrate BS1. For example, the metal layer MTL is formed by a physical vapor deposition (PVD) or the like. The metal layer MTL may include a high-reflectivity metal. The high-reflectivity metal includes aluminum, gold, silver, copper, chromium, iron, nickel, molybdenum, or an alloy thereof. For example, the metal layer MTL may have a single layer formed of aluminum. The metal layer MTL may have a double layer including a lower layer formed of aluminum and an upper layer formed of titanium. The metal layer MTL may have a double layer comprising a lower layer of aluminum and an upper layer of molybdenum. The metal layer MTL is not limited thereto, but may be formed in various ways using the high-reflectivity metal.

The preliminary pattern layer PPN may include an organic insulating material such as, for example, silicon nitride or silicon oxide.

Figure 6B:
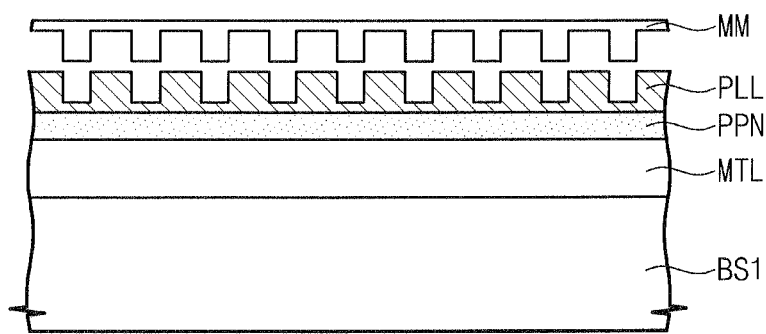
Figure 6C:
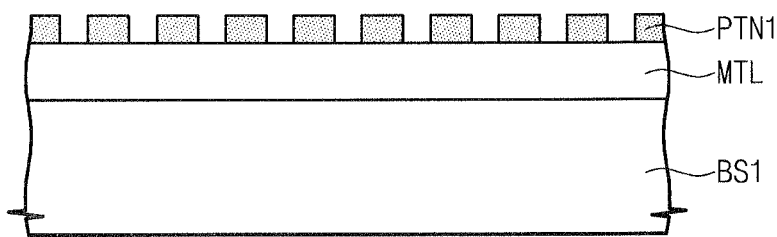

Referring to FIGS. 6B and 6C, a first pattern layer PTN1 is formed on the metal layer MTL according to a process step S13.

Referring to FIG. 6B, a first pattern is formed in a polymer layer PLL with a mater mold MM in a process step S13. The polymer layer PLL is formed on the second base substrate BS2. The mater mold MM includes a reverse pattern of the first pattern formed in the polymer layer PLL. The mater mold MM is imprinted in the polymer layer PLL and forms the first pattern in the polymer layer PLL. A polymer layer PLL formed on the second base substrate BS2 is a layer that is not cured yet, has liquidity, and is cured following the imprinting. The first pattern corresponds to the same pattern as a wire grid of a wire-grid polarizer.

Referring to FIG. 6C, a first patter layer PTN1 is formed by patterning the polymer layer PLL and the preliminary pattern layer PPN. The polymer layer PLL is used as a mask in patterning the polymer layer PLL and the preliminary pattern layer PPN.

Figure 6D:
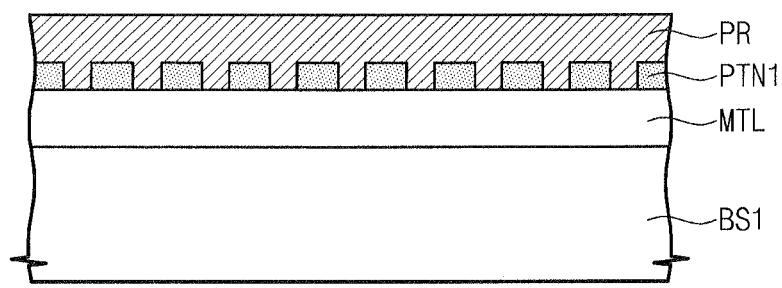
Figure 6E:
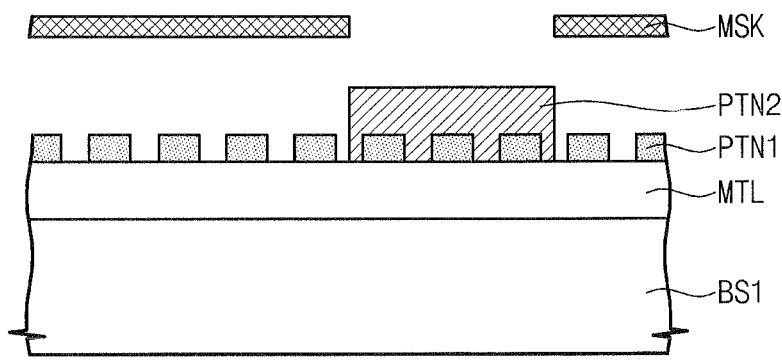

Referring to FIGS. 6D and 6E, a second pattern layer PTN2 is formed on the metal layer MTL according to a process step S15.

Referring to FIG. 6D, a photoresist layer PR is formed on the resulting structure of FIG. 6C. The photoresist layer PR is formed on the first pattern layer PTN1.

As is shown in FIG. 6E, the photoresist layer PR is exposed using a mask MSK to form the second pattern layer PTN2. In an exemplary embodiment, the photoresist layer PR is a negative-type photoresist. The photoresist layer PR is exposed using a photomask MSK which blocks light from irradiating an area corresponding to a display area DA and allows light to irradiate an area corresponding to a non-display area NDA. When the photoresist PR is removed by a developer, the unexposed region of the display area DA is removed, leaving the exposed region of the non-display area NDA behind. The second patter layer PTN2 remains on the non-display area NDA. The photoresist PR is not limited thereto and may be a positive-type photoresist.

Figure 6F:
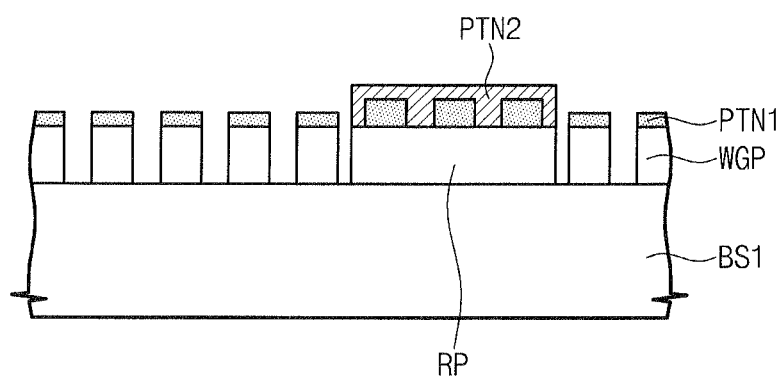

Referring to FIG. 6F, the metal layer MTL is patterned using the second pattern layer PTN2 the first pattern layer PTN1 as a mask according to a process step of S17. As a result, the metal layer MTL corresponding to the display area DA is defined by the shape of the second pattern layer PTN2. The display area DA may include a wire-grid polarizing part patterned by the first pattern layer PTN1. The metal layer corresponding to the non-display area NDA is not patterned and is a reflection part RP.

Figure 6G:
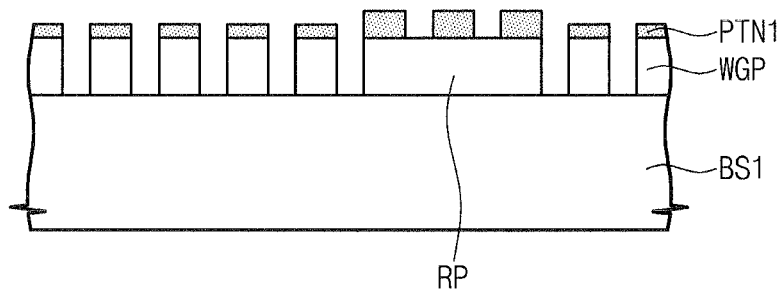

Referring to FIG. 6G, the second pattern layer PTN2 is removed to form a first polarizing member POL1 according to a process step of S19. In an exemplary embodiment of the inventive concept, the first pattern layer PTN1 remains. In an embodiment, the first pattern layer PTN1 may be removed.

With reference to the method of forming the first polarizing member POL1, a fabrication method of a liquid crystal display according to an embodiment of the inventive concept will be now be described with reference to plan views and cross-sectional views. FIGS. 7A-11A are plan views illustrating a fabrication method of a liquid crystal display according to an exemplary embodiment of the inventive concept. FIGS. 7B-11B are cross-sectional views taken along the line I-I' in FIGS. 7A-11A, respectively.

Figure 7A:
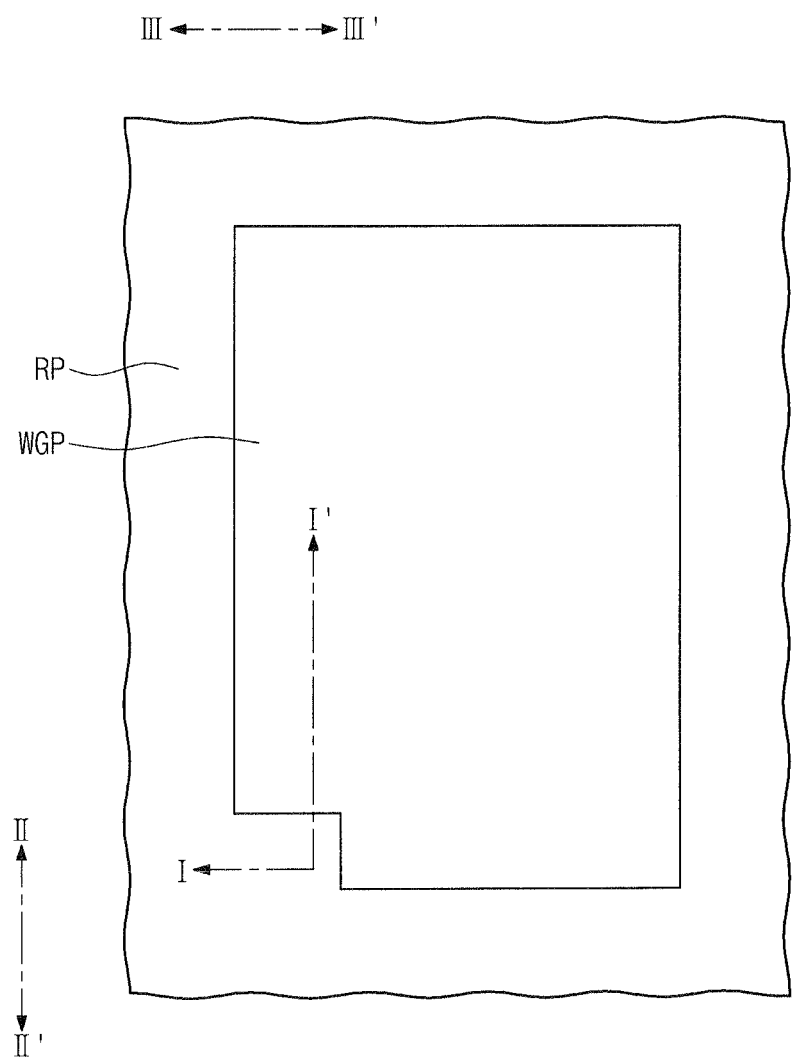
FIGS. 7A, 8A, 9A, 10A, and 11A are plan views illustrating a fabrication method of a liquid crystal display according to an exemplary embodiment of the inventive concept.
Figure 7B:
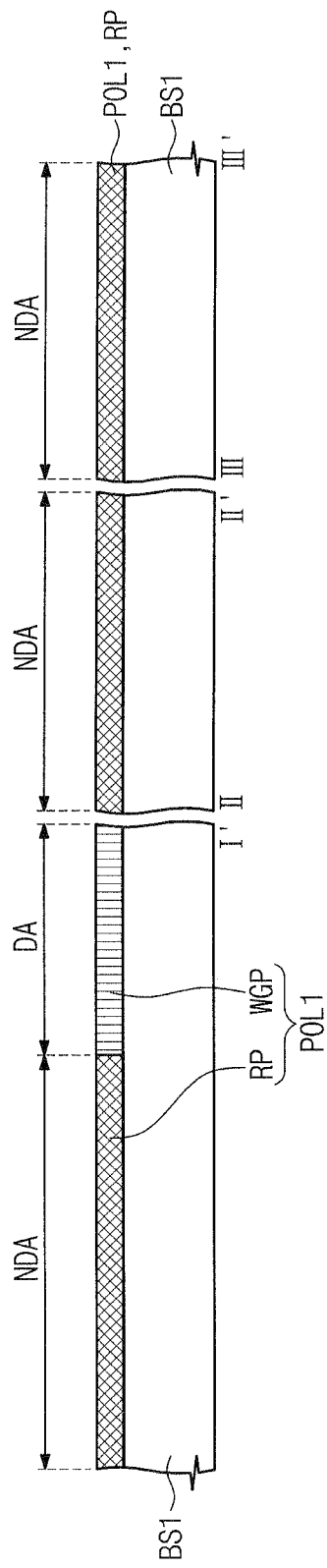
FIGS. 7B, 8B, 9B, 10B, and 11B are cross-sectional views taken along the line I-I' in FIGS. 7A, 8A, 9A, 10A, and 11A, respectively.

Referring to FIGS. 7A and 7B, a first polarizing member POL1 is formed on a first base substrate BS1. The first polarizing member POL1 may include a reflection part RP and a wire-grid polarizing part WGP. The reflection part RP is formed in the non-display area NDA. The reflection part RP is formed in a non-display area NDA of the pixel area PA. The reflection part RP is also formed in a non-display area NDA corresponding to a pad area PDA. The wire-grid polarizing part WGP is formed in a display area DA.

Figure 8A:
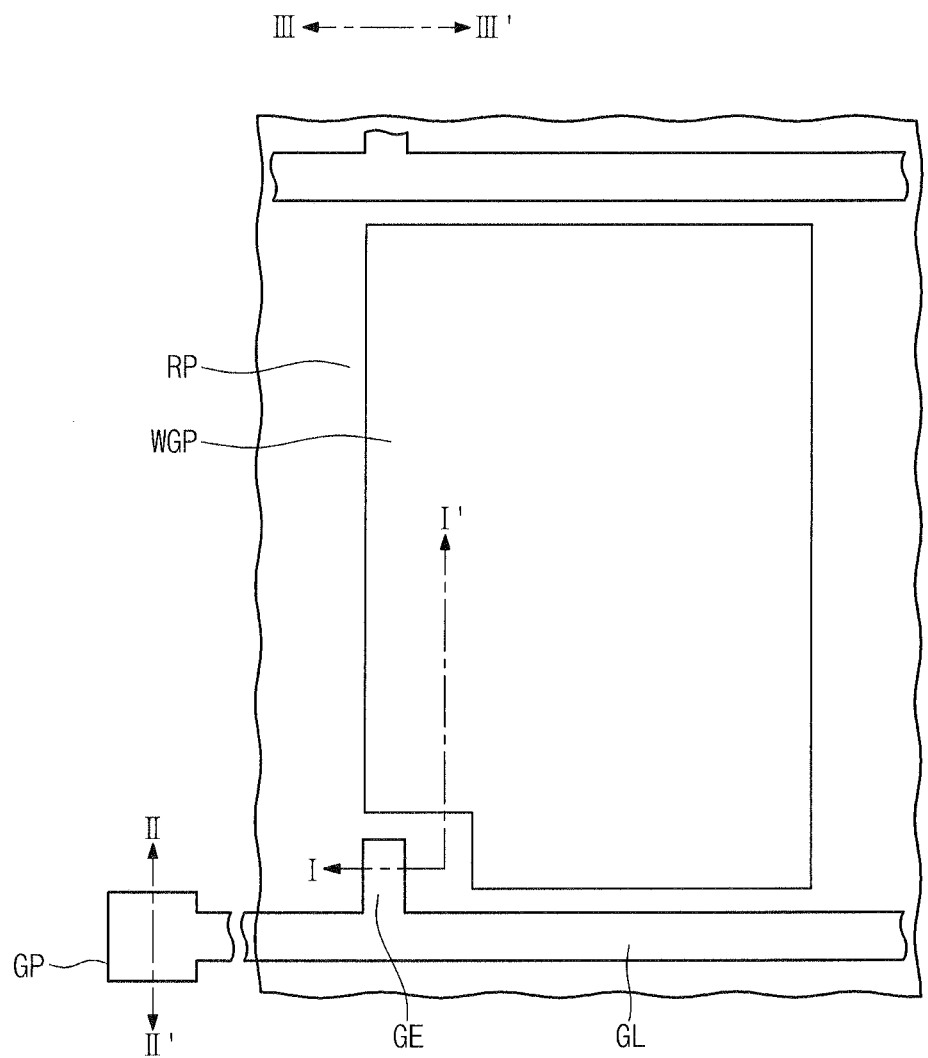
Figure 8B:
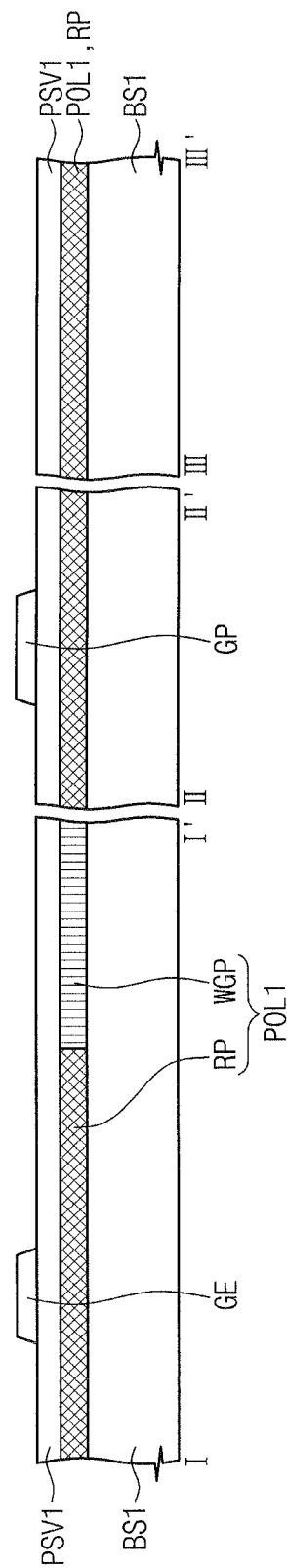

Referring to FIGS. 8A and 8B, a first passivation layer PSV1 is formed on the first polarizing member POL1. A gate wiring part is formed on the first passivation layer PSV1. The gate wiring part includes a gate line GL, a gate electrode GE, and a gate pad GP.

The gate wiring part may be formed of a conductive material, e.g., a metal. A metal layer (not shown) is formed on the first passivation layer PSV1 and is patterned to form the gate wiring part using a photolithography process. The gate wiring part may include a single layer formed of a single metal but need not be limited thereto. The gate wiring part may include multiple layers formed of at least two kinds of metals and/or an alloy of the metals.

Figure 9A:
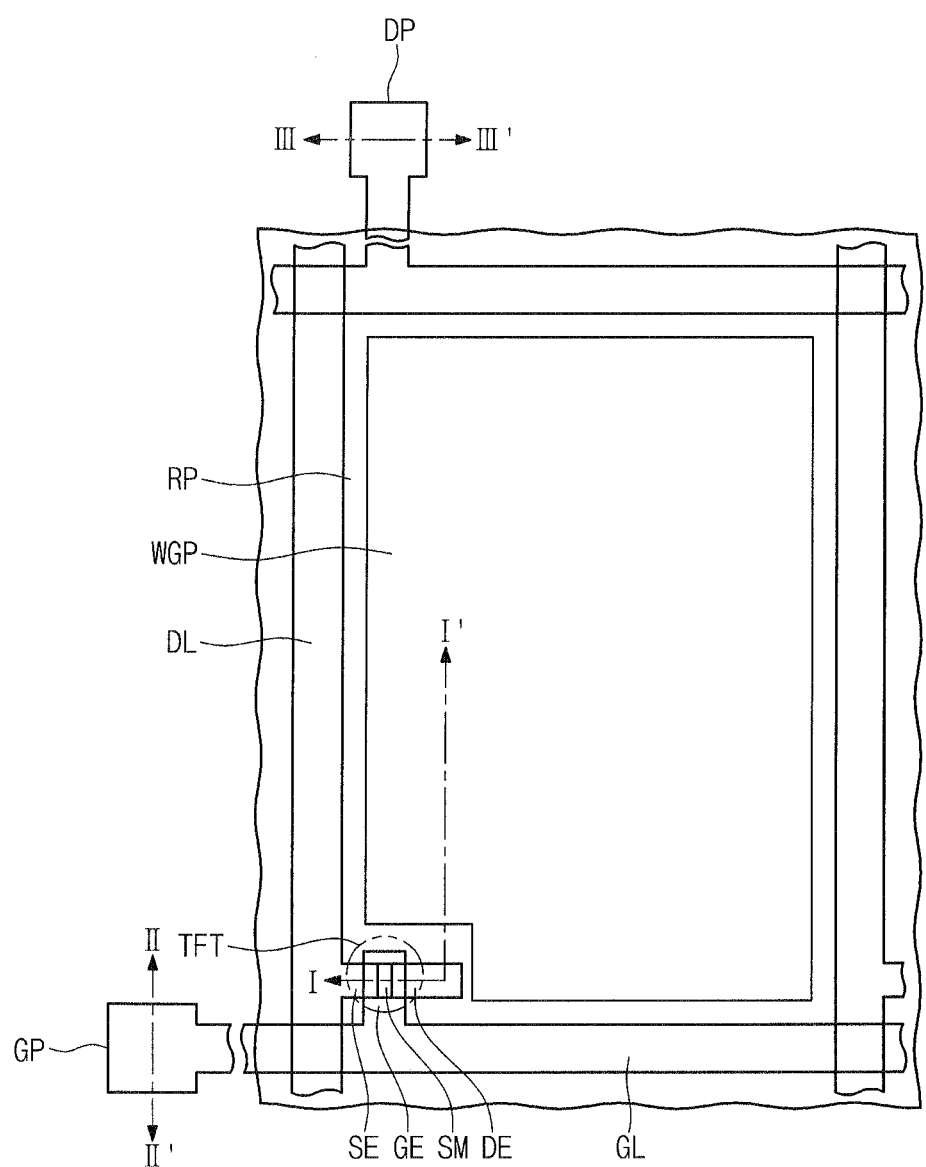
Figure 9B:
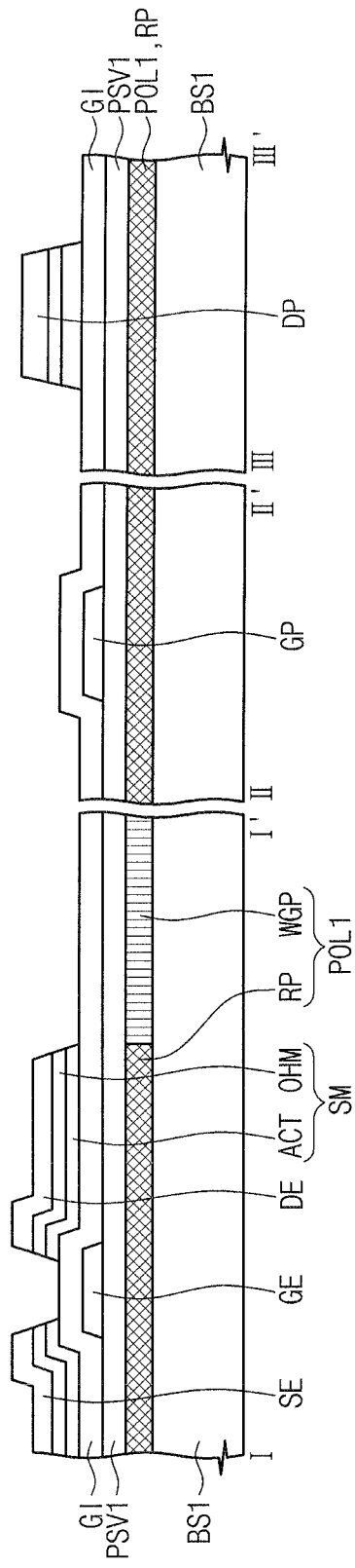

Referring to FIGS. 9A and 9B, a gate insulating layer GI is formed on the resulting structure of FIGS. 9A and 8B. A semiconductor layer SM and a data wiring part are formed after the gate insulating layer GI is formed. The data wiring part includes a data line DL, a source electrode SE, a drain electrode DE, and data pad DP. The data line extends in a second direction perpendicular to the first direction. The source electrode SE protrudes from the data line DL. The drain electrode DE is spaced opposite to the source electrode SE. The data pad DP is formed at the opposite side of the wire-grid polarizing part WGP from the gate line GL.

The gate insulating layer GI is formed by stacking an insulating material on the gate wiring part.

The data wiring part is formed by sequentially stacking a first semiconductor material, a second semiconductor material, and a conductive material (e.g., metal) on the first base substrate BS1 and selectively etching a first semiconductor layer (not shown) formed of the first semiconductor material, a second semiconductor layer (not shown) formed of the second semiconductor material, and a conductive layer (not shown) formed of the conductive layer by a photolithography process. A mask used in the photolithography process may have a slit mask or a diffraction mask.

The gate electrode GE, the source electrode SE, the drain electrode DE, and the semiconductor layer SM constitute a thin film transistor.

Figure 10A:
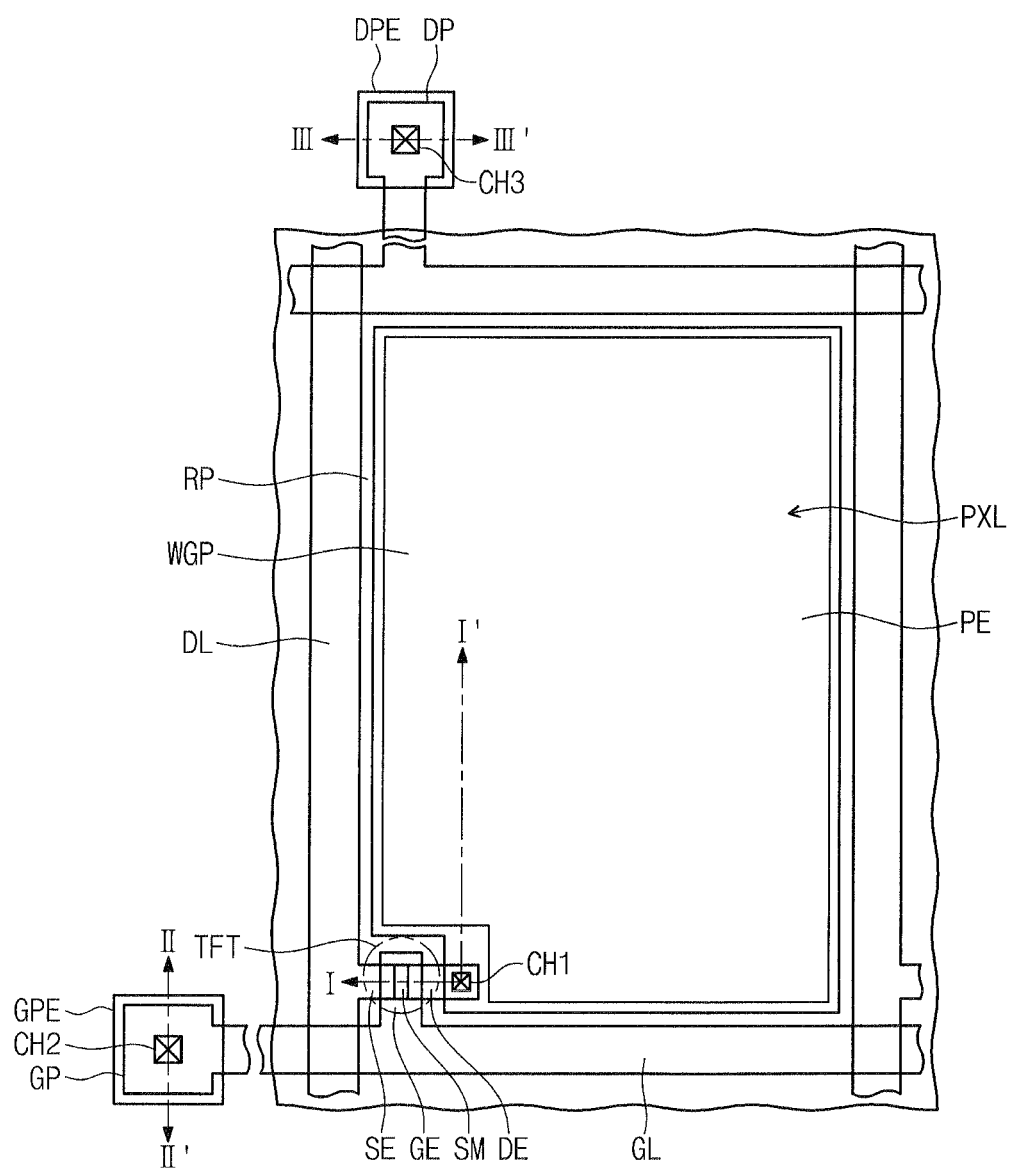
Figure 10B:
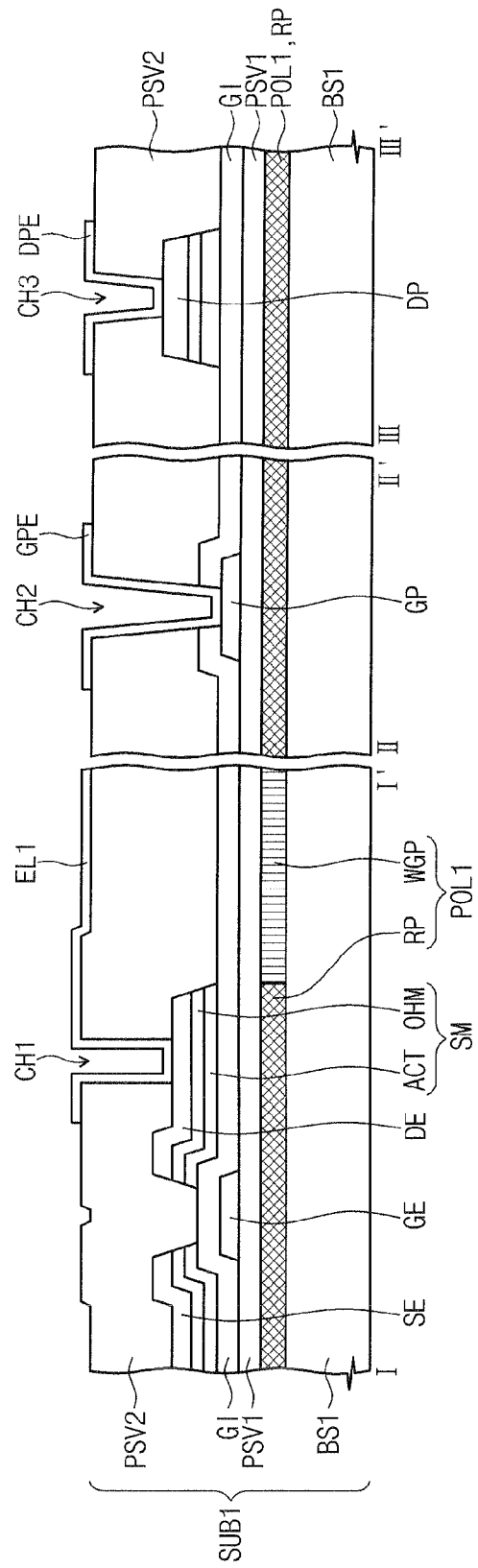

Referring to FIGS. 10A and 10B, a second passivation layer PSV2 is formed on the resulting structure of FIGS. 9A and 9B. A first electrode EL1, a gate pad electrode GPE, and a data pad electrode DPE are formed on the second passivation layer PSV2 through contact holes CH1, CH2, and CH3, respectively. The contact holes CH1, CH2, and CH3 are formed by a photolithography process to expose a portion of the drain electrode DE, a portion of the gate pad GP, and a portion of the data pad DP, respectively. The first electrode EL1 is connected to the drain electrode DE1 through the first contact hole CH1. The gate pad electrode GPE is connected to the gate pad GP through the second contact hole CH2. The data pad electrode DPE is connected to the data pad DP through the third contact hole CH2.

Figure 11A:
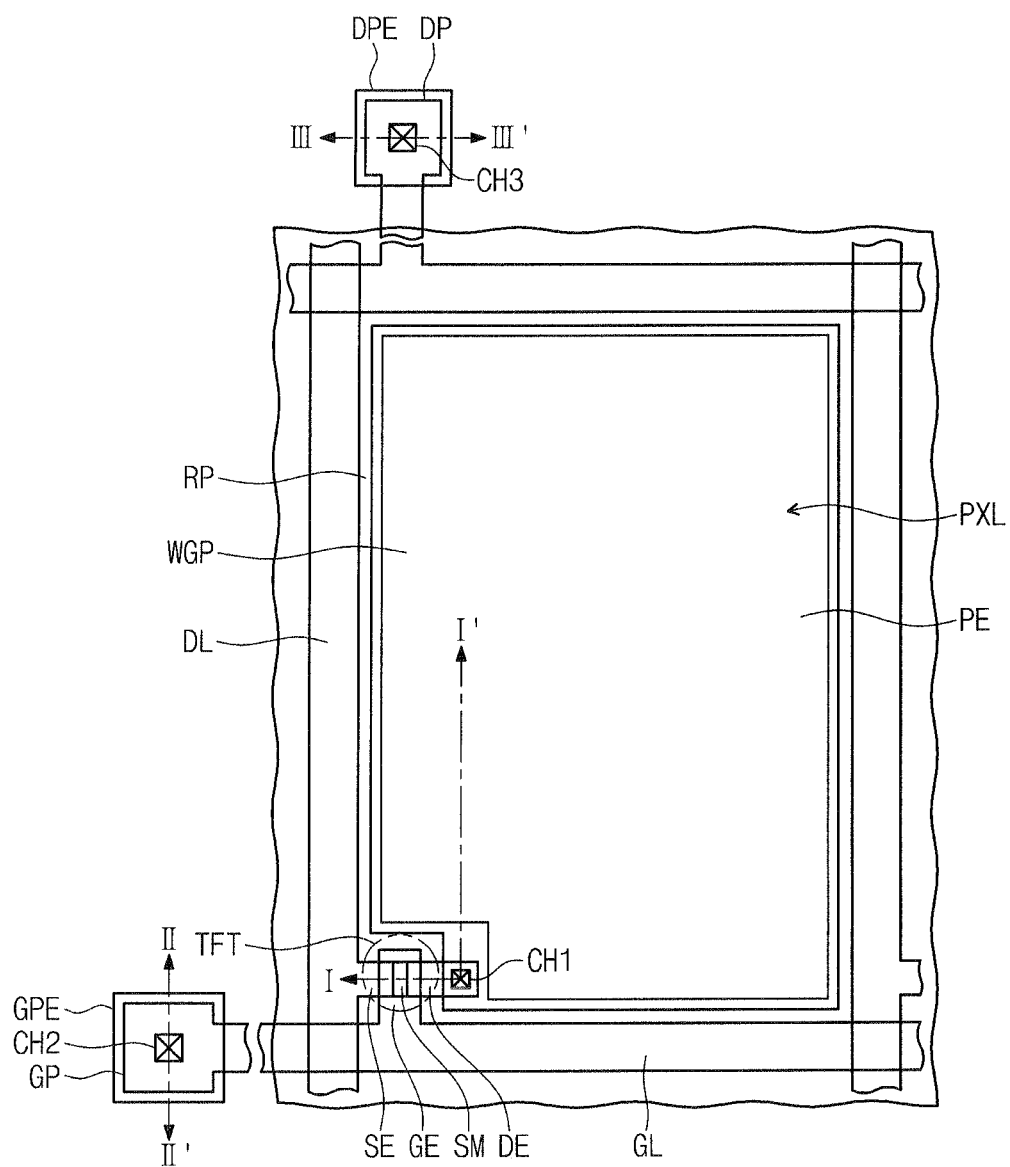
Figure 11B:
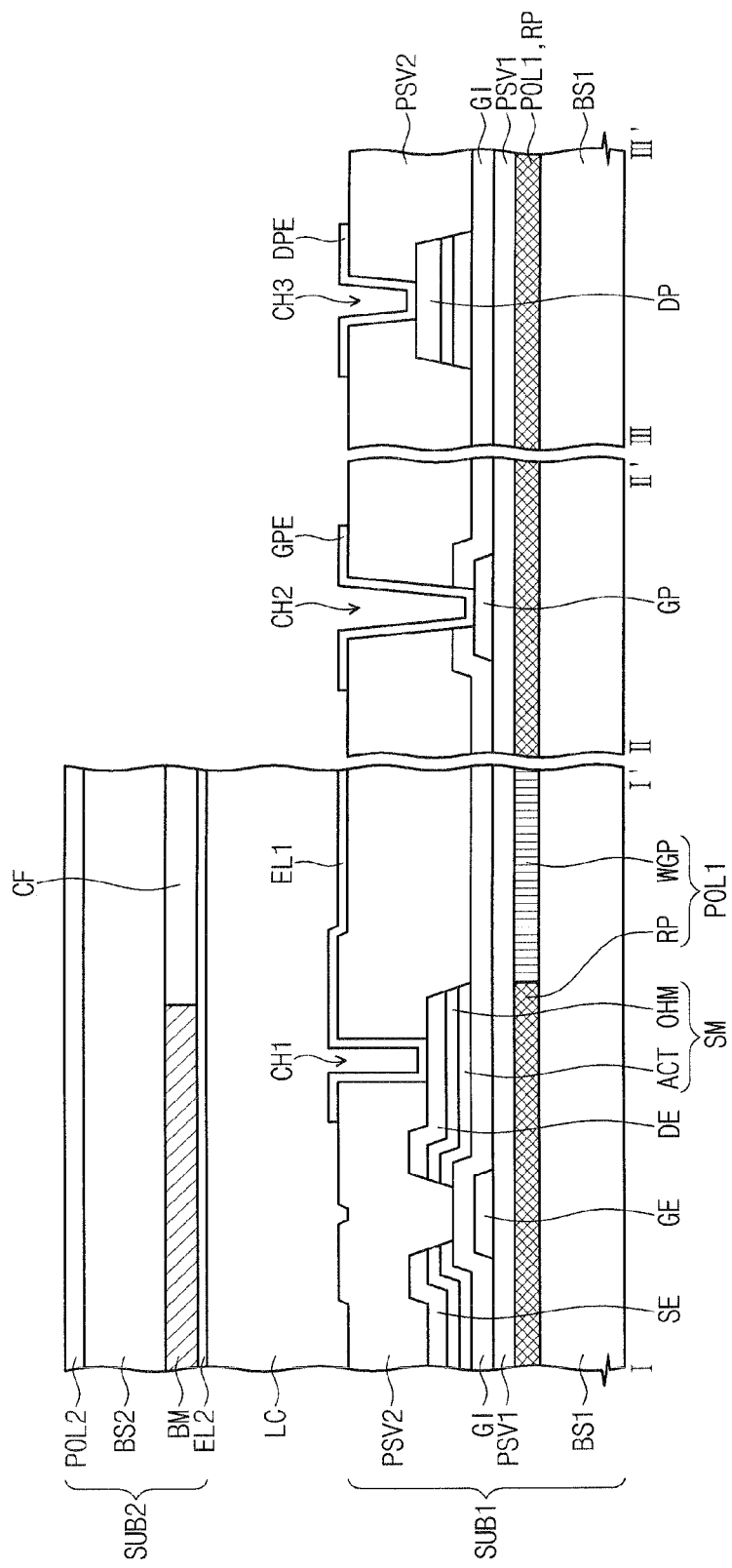

Referring to FIGS. 11A and 11B, a black matrix BM and a color filter CF are formed on a second base substrate BS2. The color filter CF may be formed by forming a color layer exhibiting red, green, blue or another color on the second base substrate BS2 and patterning the color layer by a photolithography process. The method of forming the color filter CF is not limited thereto and it may be formed by an inkjet method.

The black matrix BM may be formed by forming a light shielding layer absorbing light on the second base substrate BS2 and patterning the light shielding layer by a photolithography process. The photolithography process may use the photomask used in forming the first polarizing member POL1. In the pixel area PA, an area in which the black matrix BM is formed matches an area in which the reflection part RP of the first polarizing member POL1 is formed. Therefore, the same mask may be used. The color filter layer of the color filter CF and the black matrix may be formed in various orders. For example, a black matrix BM may be formed after red, green, and blue color layers are formed. Alternatively, red, green, and blue color layers may be formed after a black matrix BM is formed. In addition, the formation order of the color layers may be changed.

A second electrode EL2 is formed on the color filter CF and the black matrix BM.

Referring to FIGS. 11A and 11B, the second substrate SUB2 is stacked over the first substrate SUB1. A liquid crystal layer LC is formed between the first substrate SUB1 and the second substrate SUB2. In an exemplary embodiment, the liquid crystal layer LC may be formed on the first substrate SUB1. The second substrate SUB2 is stacked on the liquid crystal layer LC and the second electrode EL2 of the second substrate SUB2 is in contact with the liquid crystal layer LC. In an embodiment, the liquid crystal LC may be formed on the second electrode EL2 of the second substrate SUB2. A second polarizing member POL2 is formed on the opposite surface of the second substrate SUB2 from the second electrode EL2. The second polarizing member POL2 may be separately formed and attached to the second base substrate BS2 with an adhesive (not shown) interposed therebetween.

Figure 12:
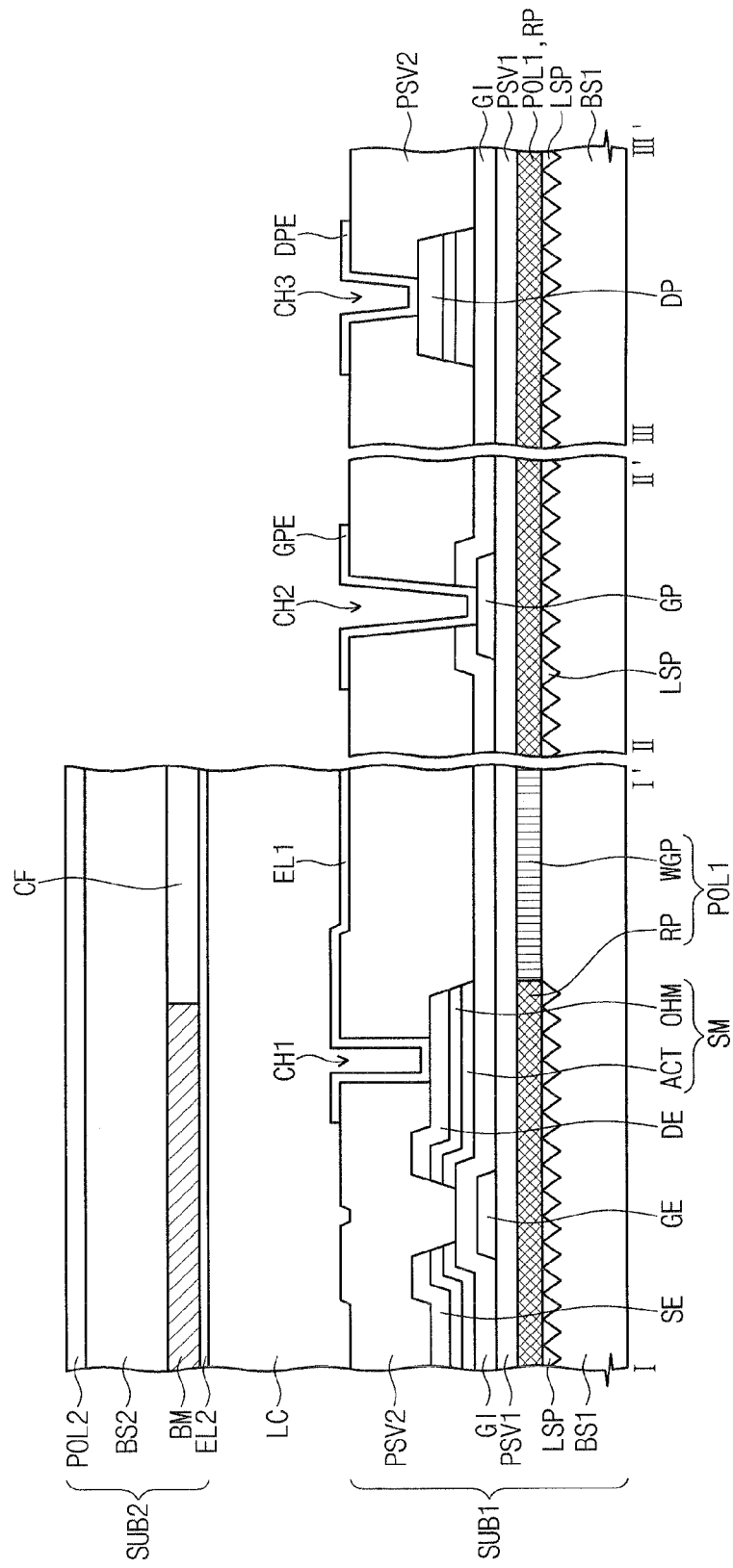
FIG. 12 is a plan view of a liquid crystal display according to an exemplary embodiment of the inventive concept.

FIG. 12 is a cross-sectional view of a liquid crystal display according to an exemplary embodiment of the inventive concept. The liquid crystal display of FIG. 12 is substantially the same structure as that of FIG. 11B except that the liquid crystal display of FIG. 12 includes a light scattering part LSP. For simplicity of explanation, such difference will be explained in detail below. Like references may refer to the like elements in FIGS. 11B and 12.

Referring to FIG. 12, the liquid crystal display may be provided with a light scattering part LSP to increase a recycle rate of light traveling upwardly from an underlying backlight unit. In an exemplary embodiment of the inventive concept, the light scattering part LSP is formed on an upper surface of the first base substrate BS1 corresponding to the non-display area NDA and includes a scattering pattern to scatter the light travelling upwardly from the light source LS below. For example, the light scattering part LSP includes a fine uneven pattern arranged at random. The surface roughness of the fine uneven pattern may be less than about 20 nanometers.

In an exemplary embodiment of the inventive concept, the fine uneven pattern may be formed on the first base substrate BS1 by a photolithography process. For example, a photoresist is coated on the first base substrate BS1 and then exposed and developed to remove a photoresist in an area except for the display area DA. The first base substrate BS1 is etched to form a light scattering pattern on a top surface of the first base substrate BS1 corresponding to the non-display area NDA, and the remaining photoresist is removed. The inventive concept is not limited thereto, but the light scattering pattern may be formed on the first base substrate BS1 by forming an additional layer on the non-display area NDA and patterning the additional layer.

FIG. 13 is a cross-sectional view of a liquid crystal display according to an exemplary embodiment of the inventive concept. The liquid crystal display of FIG. 13 is substantially the same structure as that of FIG. 11B except that the second polarizing member POL2 is formed between the second base substrate and the black matrix BM. For simplicity of explanation, such difference will be explained in detail below. Like references may refer to the like elements in FIGS. 11B and 13.

The second polarizing member POL2 may be formed between the second base substrate BS2 and the black matrix. The second polarizing member POL2 may include a wire-grid polarizing part WGP arranged in parallel or perpendicular to that the first polarizing member POL. The second polarizing member POL2 may include a reflection part RP formed in at least a partial area of the second polarizing member POL2. The second polarizing member POL2 is not limited thereto, but may include a polarize other than a wire-grid polarizing part WGP.

In an embodiment of the inventive concept, the liquid crystal display is not limited to the structure described above. The first electrode EL1 or the second electrode EL2 may be formed on the first base substrate SUB1 or the second base substrate SUB2. In an embodiment of the inventive concept, the color filter may be formed on the first base substrate SUB1.

According to exemplary embodiments of the inventive concept, light from a backlight unit is reflected in a non-display area by a reflection part RP and the reflected light is recycled to increase the luminance of the liquid crystal display. The increase of the luminance will now be described in detail below.

When a first polarizing member is formed only of a wire-grid polarizing part as a comparative sample, Luminance $E_{WGP}$ is expressed as equation (1). $T_{total}$ represent total transmittance of light emitted from the light source LS and T represents transmittance of a wire-grid polarizing part. R represents reflectivity of the wire-grid polarizing part, and $\alpha$ represents a recycle constant of light at the backlight unit. The $\alpha$ is the specific property of the first polarizing member, which varies according to the material, shape, etc. of the first polarizing member.

$$E_{WGP} = T_{total} / T = \frac{1}{(1 - \alpha R)} \quad \text{Equation (1)}$$

where, $$T_{total} = T + \alpha RT + \alpha^2 R^2 T + \ldots = \frac{T}{(1 - \alpha R)}$$

When a first polarizing member includes a wire-grid polarizing part POL1 acting as a display area and a reflection part RP acting as a non-display area, luminance $E_{WGP}$ may be represented by equation (2).

$$E_{WGP} = T_{total} / AT = \frac{1}{1 - [\alpha AR + \alpha(1-A)R']} \quad \text{Equation (2)}$$

where, $$T_{total} = \frac{AT}{1 - [\alpha AR + \alpha(1-A)R']}$$

The luminance of equation (2) may be modified from the luminance of equation (1) by factors R' and A. R' represents reflectivity of a reflection part. A represents a ratio of a display area to the entire area, i.e., an aperture ratio.

Figure 14A:
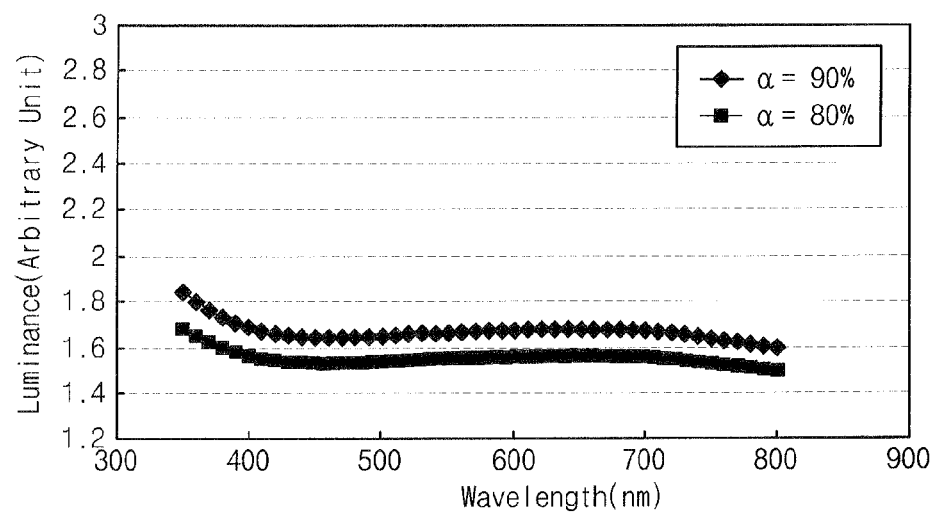
FIGS. 14A and 14B shows luminance values obtained from a comparative sample and an embodiment of the inventive concept, respectively.
Figure 14B:
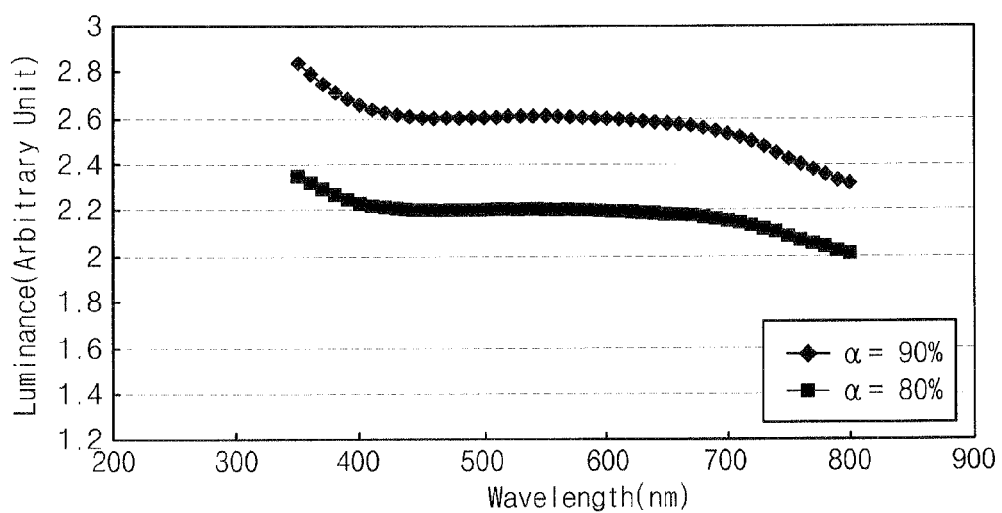

FIG. 14A shows luminance values of the comparative sample and FIG. 14B shows luminance values of an embodiment of the inventive concept. In FIG. 14A, the luminance values are expressed as relative ratios of luminance of the comparative sample to an existing liquid crystal display using a conventional polarizing member. In FIG. 14B, the luminance values are expressed as relative ratios of luminance of the embodiment of the inventive concept to the existing liquid crystal display. Both the comparative sample and the embodiment are fabricated under the same conditions except for first polarizing member. For example, the metal layer has a thickness of about 150 nanometers and a pitch of about 100 nanometers. In measuring the luminance, light is incident perpendicularly on the first base substrate BS1. The first polarizing member and the second polarizing member may be disposed to be perpendicular to each other with respect to their polarization axes, and an aperture ratio A may beat about 45 percent.

As shown in FIG. 14A, the comparative example has luminance values of about 1.5 when $\alpha$ is about 80 percent and about 1.9 when $\alpha$ is about 90 percent. In FIG. 14B, the embodiment of the inventive concept has luminance values of about 2.2 when $\alpha$ is about 80 percent and 2.8 when $\alpha$ is about 90 percent. The embodiment of the inventive concept has luminance value higher than that of the comparative sample. As a result, it will be understood that high luminance may be obtained.

As described above, according to a conventional invention, light is absorbed in a black-matrix-formed area and thus the overall luminance of a liquid crystal display decreases. Meanwhile, according to the present inventive concept, a reflection part is provided in a black-matrix-formed area to increase the luminance of a liquid crystal display. In addition, since the reflection part is provided at the same area as the black-matrix-formed area, the fabrication process is simplified and fabrication cost is reduced. Moreover, since a first polarizing member may be formed on a first base substrate by using an existing process apparatus without separate formation of the first polarization member, time and cost required for forming the first polarizing member are reduced.

As described so far, a liquid crystal display with high luminance is provided. In addition, a simple and low-cost method of fabricating a liquid crystal display is provided. The liquid crystal display is not limited to the structure described above. The first electrode or the second electrode may be formed on any one of the first and second base substrates, and the color filter may also be formed on the first base substrate. Furthermore, the shape of the liquid crystal display need not be limited to a specific shape While the present inventive concept has been shown and described with reference to exemplary embodiments thereof, it will be apparent to those of ordinary skill in the art that various changes in form and detail may be made therein without departing from the sprit and scope of the inventive concept.

What is claimed is:

1. A liquid crystal display apparatus comprising:
a liquid crystal layer;
a black matrix disposed on the liquid crystal layer; and
a first polarizing member including a wire-grid polarizing part and a reflection part, the first polarizing member being disposed on an opposite side of the liquid crystal layer from the black matrix, wherein the reflection part overlaps the black matrix, wherein the reflection part and the wire-grid polarizing part are disposed directly on a same layer, wherein the wire-grid polarizing part and the reflection part do not overlap each other, and wherein the reflection part has a shape substantially the same with the black matrix in a cross-sectional view, and the black matrix covers whole of the reflection part in the cross-sectional view.

2. The liquid crystal display apparatus of claim 1, further comprising a first base substrate including a display area on which the wire-grid polarizing part is disposed.

3. The liquid crystal display apparatus of claim 2, further comprising a light source facing an opposite side of the first base from the first polarizing member.

4. The liquid crystal display apparatus of claim 2, further comprising: a gate line disposed on the first base substrate; a data line perpendicular to the gate line; a thin film transistor connected to the gate line and the data line; a first electrode connected to the thin film transistor; and a second electrode disposed on the opposite side of the liquid crystal layer from the first electrode, wherein the first and the second electrodes establish an electric field in the liquid crystal layer.

5. The liquid crystal display apparatus of claim 4, wherein the first base substrate further comprises a non-display area where a gate pad part and a data pad part are formed, wherein the gate pad part is disposed at one end of the gate line and the data pad part is disposed at one end of the data line. disposed.

6. The liquid crystal display apparatus of claim 1, wherein the wire-grid polarizing part includes a plurality of metal lines extending in a direction.

7. The liquid crystal display apparatus of claim 6, wherein each of the plurality of metal lines includes at least one metal of aluminum, gold, silver, copper, chromium, iron, nickel, molybdenum, and an alloy thereof.

8. The liquid crystal display apparatus of claim 6, wherein each of the plurality of metal lines includes at least two metal layers.

9. The liquid crystal display apparatus of claim 1, further comprising a second polarizing member disposed on an opposite side of the liquid crystal layer from the first polarizing member, wherein the second polarizing member has a polarizing axis perpendicular to that of the first polarizing member.

10. The liquid crystal display of claim 9, wherein the second polarizing member is provided between the liquid crystal layer and the second base substrate or provided opposite to the liquid crystal layer with the second base substrate interposed therebetween.

11. The liquid crystal display apparatus of claim 1, further comprising a light scattering part disposed under the reflection part.

12. The liquid crystal display apparatus of claim 11, wherein the first base substrate include a rough surface as the light scattering part.

13. A liquid crystal display apparatus comprising:
a liquid crystal layer;
a light source;
a black matrix disposed on the liquid crystal layer;
a first polarizing member including a wire-grid polarizing part and a reflection part and being disposed between the liquid crystal layer and the light source; and
a reflector disposed below the light source,
wherein the reflector reflects light from the light source and light reflected from the reflection part and
wherein the wire-grid polarizing part and the reflection part do not overlap each other,
wherein the wire-grid polarizing part and the reflection part are disposed on a same layer, and
wherein the reflection part has a shape substantially the same with the black matrix in a cross-sectional view, and the black matrix covers whole of the reflection part in the cross-sectional view.

14. The liquid crystal display apparatus of claim 13, further comprising a light scattering part disposed below the reflection part.

15. The liquid crystal display apparatus of claim 14, wherein the light scattering part is formed of a roughed surface of a transparent insulating layer.

16. The liquid crystal display apparatus of claim 15, wherein the roughed surface has a surface roughness of about 20 nm, wherein the surface roughness is a difference in height between a bottom and a summit of the roughed surface.

* * * * *